United States Patent
Hu et al.

(10) Patent No.: US 12,093,596 B2
(45) Date of Patent: Sep. 17, 2024

(54) DISTRIBUTED SOP DISPLAY PANEL AND DISPLAY SYSTEM

(71) Applicant: WUHAN CHINA STAR OPTOELECTRONICS TECHNOLOGY CO., LTD., Hubei (CN)

(72) Inventors: Zemin Hu, Hubei (CN); Guowei Zha, Hubei (CN); Guanghui Liu, Hubei (CN); Zhifu Li, Hubei (CN); Xiaolin Yan, Hubei (CN); Wanliang Feng, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/622,795

(22) PCT Filed: Dec. 9, 2021

(86) PCT No.: PCT/CN2021/136822
§ 371 (c)(1),
(2) Date: Dec. 24, 2021

(87) PCT Pub. No.: WO2023/092676
PCT Pub. Date: Jun. 1, 2023

(65) Prior Publication Data
US 2024/0036795 A1    Feb. 1, 2024

(30) Foreign Application Priority Data
Nov. 29, 2021    (CN) .................. 202111437044.7

(51) Int. Cl.
*G06F 3/14*    (2006.01)

(52) U.S. Cl.
CPC .......... *G06F 3/1438* (2013.01); *G06F 3/1446* (2013.01)

(58) Field of Classification Search
CPC ..................... G06F 3/1438; G06F 3/1446
See application file for complete search history.

(56) References Cited

U.S. PATENT DOCUMENTS

| | | | | |
|---|---|---|---|---|
| 2009/0267887 A1* | 10/2009 | Sah | ........ | G09G 3/3688 345/100 |
| 2010/0134384 A1* | 6/2010 | Kim | ........ | G06F 3/1431 348/E7.003 |
| 2011/0057943 A1* | 3/2011 | Ivashin | ........ | H04N 9/3147 345/589 |

(Continued)

FOREIGN PATENT DOCUMENTS

| | | |
|---|---|---|
| CN | 102736885 A | 10/2012 |
| CN | 104795034 A | 7/2015 |

(Continued)

OTHER PUBLICATIONS

International Search Report in International application No. PCT/CN2021/136822, mailed on Jun. 28, 2022.

(Continued)

*Primary Examiner* — Ryan A Lubit
(74) *Attorney, Agent, or Firm* — PV IP PC; Wei Te Chung

(57) ABSTRACT

The present application provides a distributed system on panel (SOP) display panel and a display system. The distributed SOP display panel includes a plurality of display modules and a plurality of functional modules. Each display module includes a plurality of display units. The functional modules include first functional modules and a second functional module. The first functional modules are electrically connected to the display units in adjacent display modules, the second functional module is electrically connected to the plurality of display modules, in order to (Continued)

alleviate a technical problem of improper layout of system functions of a conventional SOP display device.

20 Claims, 5 Drawing Sheets

(56) References Cited

U.S. PATENT DOCUMENTS

| | | | |
|---|---|---|---|
| 2016/0019834 A1* | 1/2016 | Hall | G09G 3/32 345/212 |
| 2017/0220310 A1* | 8/2017 | Hochman | H01R 13/6205 |
| 2017/0255504 A1* | 9/2017 | Fletcher | G09G 3/2096 |
| 2019/0265939 A1* | 8/2019 | Foster | H05K 5/0256 |
| 2020/0211447 A1* | 7/2020 | Mays | G09G 3/32 |
| 2021/0027703 A1* | 1/2021 | Lin | G09G 3/20 |
| 2021/0249448 A1 | 8/2021 | Yokotani et al. | |
| 2023/0395007 A1* | 12/2023 | Zhang | G06F 3/1446 |

FOREIGN PATENT DOCUMENTS

| | | |
|---|---|---|
| CN | 104965369 A | 10/2015 |
| CN | 108010498 A | 5/2018 |
| CN | 108709171 A | 10/2018 |
| CN | 208970143 U | 6/2019 |
| CN | 110910775 A | 3/2020 |
| CN | 111399268 A | 7/2020 |
| CN | 112233606 A | 1/2021 |

OTHER PUBLICATIONS

Written Opinion of the International Search Authority in International application No. PCT/CN2021/136822, mailed on Jun. 28, 2022.

Chinese Office Action issued in corresponding Chinese Patent Application No. 202111437044.7 dated Apr. 22, 2023, pp. 1-6.

* cited by examiner

DISTRIBUTED SOP DISPLAY PANEL AND DISPLAY SYSTEM

BACKGROUND OF DISCLOSURE

Field of Disclosure

The present disclosure relates to a field of display technology, and in particularly to a distributed system on panel (SOP) display panel and a display system.

Description of Prior Art

At present, large-screen full high definition (FHD) display devices and display devices with resolution above FHD are development trends in the display field. However, high resolution display devices correspond to a large amount of data, and the large amount of data requires a high data transmission rate. A conventional display device that integrates a system into a distributed SOP display panel, system functions are integrated into a non-display area of the distributed SOP display panel, so that a proportion of a display area decreases seriously, and does not conform to a development trend of a full screen. Alternatively, the system functions are simply integrated into gaps between pixels in a display area of the distributed SOP display panel, which cannot carry a high data transmission rate, and wires are increased in the display area, and excessive wires may interfere with display pixels.

Therefore, how to properly layout the system functions of the conventional SOP display device is crucial.

SUMMARY OF DISCLOSURE

The present disclosure provides a distributed SOP display panel and a display system to alleviate a technical problem of improper layout of system functions of a conventional SOP display device.

In order to solve the above technical problem, the present disclosure provides the following technical solutions:

The present disclosure provides a distributed system on panel (SOP) display panel, comprising:
  a plurality of display modules, wherein each of the display modules is configured to receive corresponding display signals, each of the display modules comprises a plurality of display units, and a parameter of each of the display signals is less than or equal to a processing capability peak value of a corresponding display module; and
  a plurality of functional modules, wherein each of the functional modules comprises a plurality of functional units, the functional units are disposed between adjacent display units, each of the functional modules is configured to receive corresponding functional signals, and a parameter of each of the functional signals is less than or equal to a processing capability peak value of a corresponding functional module;
  wherein the functional modules comprise first functional modules, the functional signals comprise first functional signals, the first functional modules are electrically connected to display units in adjacent display modules, and are configured to provide corresponding unique display signals for corresponding display modules according to the first functional signals.

In the distributed SOP display panel according to the embodiments of the present disclosure, the functional modules further comprise a second functional module, the functional signals further comprise a second functional signal, and the second functional module is electrically connected to the plurality of display modules to provide sharing display signals for a corresponding plurality of display modules according to the second functional signal.

In the distributed SOP display panel according to the embodiments of the present disclosure, the distributed SOP display panel further comprises a plurality of first signal connection lines electrically connected to the first functional modules corresponding to the display modules for providing the first functional signals to the first functional modules, wherein each of the display modules comprises a plurality of display unit groups arranged at intervals in a first direction, each of the display unit groups comprises a plurality of display units arranged at intervals in a second direction, and the first signal connection lines are disposed between adjacent display units.

In the distributed SOP display panel according to the embodiments of the present disclosure, the plurality of first functional modules are arranged flush in the first direction, the first signal connection lines corresponding to the plurality of first functional modules extend in the second direction, and the first signal connection lines corresponding to different first functional modules are arranged between different display unit groups.

In the distributed SOP display panel according to the embodiments of the present disclosure, the plurality of first functional modules are staggered in the first direction, the first signal connection lines corresponding to the plurality of first functional modules extend in the first direction, and the first signal connection lines corresponding to different first functional modules are disposed between different display units.

In the distributed SOP display panel according to the embodiments of the present disclosure, the first functional modules corresponding to at least two of the display modules arranged at intervals along the first direction and/or the second direction are connected to a same first signal connection line for providing the first functional signals to the plurality of first functional modules.

In the distributed SOP display panel according to the embodiments of the present disclosure, the first functional modules comprise source signal generators, the source signal generators between different display unit groups within a same display module are cascaded connected.

In the distributed SOP display panel according to the embodiments of the present disclosure, the source signal generators comprise shift registers, the shift registers of the source signal generators are cascaded through second signal connection lines extending in the first direction.

In the distributed SOP display panel according to the embodiments of the present disclosure, at least two column of display unit groups within a same display module share one of the source signal generators.

In the distributed SOP display panel according to the embodiments of the present disclosure, the first functional modules comprise GOA signal generators and GOA modules, the GOA signal generators are disposed between adjacent two stages of GOA units of the GOA modules.

In the distributed SOP display panel according to the embodiments of the present disclosure, the distributed SOP display panel further comprises a third signal connection line electrically connected to the second functional module for providing the second functional signals to the second functional module and disposed between adjacent display units.

In the distributed SOP display panel according to the embodiments of the present disclosure, the distributed SOP display panel further comprises a plurality of fourth signal connection lines, wherein the second functional module is connected to the plurality of display modules through the plurality of fourth signal connection lines for providing the sharing display signals to the plurality of display modules, and the plurality of fourth signal connection lines are intersected between adjacent display units.

In the distributed SOP display panel according to the embodiments of the present disclosure, the distributed SOP display panel further comprises a display area and a signal input terminal located on a side of the display area, the first signal connection lines and the third signal connection line are electrically connected to the signal input terminal, and the signal input terminal supplies the functional signals to corresponding functional modules through the first signal connection lines and the third signal connection lines, respectively.

In the distributed SOP display panel according to the embodiments of the present disclosure, the functional modules further comprise third functional modules disposed between adjacent display units, and disposed in a region in which the first functional modules and/or the second functional module are not disposed.

In the distributed SOP display panel according to the embodiments of the present disclosure, the third functional modules comprise one or more of a timing control module, a ROM module, a RAM module, a CPU module, an artificial intelligence module, an antenna module, an audio module, a sensor module, or a power supply module.

Embodiments of the present disclosure further provides a distributed system on panel (SOP) display system, comprising a distributed SOP display panel comprising any one of the above-mentioned embodiments and at least one signal splitting module, wherein the signal splitting module is connected to the distributed SOP display panel for providing functional signals to functional modules.

In the distributed SOP display panel and display system provided by the present disclosure, each display module comprises a plurality of display units, and the plurality of functional modules are disposed between adjacent display units, therefore there is no needs to occupy the non-display area, therefore the narrow frame is achieved, a distance between the functional module and the display unit is reduced, an impedance of a signal transmission line is reduced, and a voltage drop is reduced. The functional modules comprise first functional modules and the second functional module, the first functional modules are electrically connected to the display units in adjacent display modules, and are configured to provide corresponding unique display signals for the corresponding display modules according to the first functional signals; the second functional module is electrically connected to a plurality of display modules, and is configured to provide sharing display signals for the corresponding plurality of display modules according to the second functional signals, so that the functional modules are reasonably disposed in the display modules, thereby solving the technical problem of improper system function layout of the conventional SOP display device.

DESCRIPTION OF DRAWINGS

In order to more clearly explain technical solutions in embodiments of the present disclosure, the following will briefly introduce the drawings required in the description of the embodiments. Obviously, the drawings in the following description are only some embodiments of the present disclosure. For those skilled in the art, without paying any creative work, other drawings can be obtained based on these drawings.

DETAILED DESCRIPTION OF EMBODIMENTS

Figure 1:
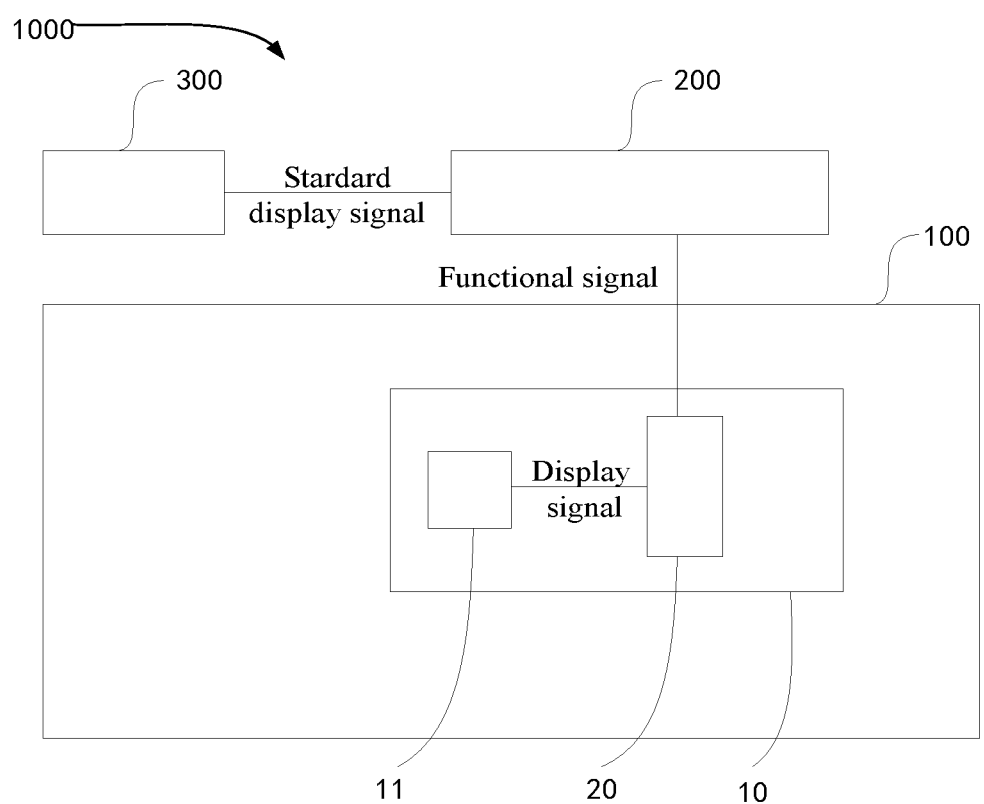
FIG. 1 is a schematic frame diagram of a distributed SOP display system according to an embodiment of the present disclosure.

The description of the following embodiments refers to the attached drawings to illustrate specific embodiments in which the present disclosure can be implemented. Directional terms mentioned in the present disclosure, such as [up], [down], [front], [back], [left], [right], [inner], [outer], [side], etc., are only directions of the attached drawings. Therefore, the directional terms used are used to describe and understand the present disclosure, rather than to limit the present disclosure. In the drawings, units with similar structures are indicated by same reference numerals. In the drawings, thicknesses of some layers and areas are exaggerated for clarity of understanding and ease of description. That is, dimensions and thickness of each component shown in the drawings are arbitrarily shown, but the present disclosure is not limited thereto.

Figure 2:
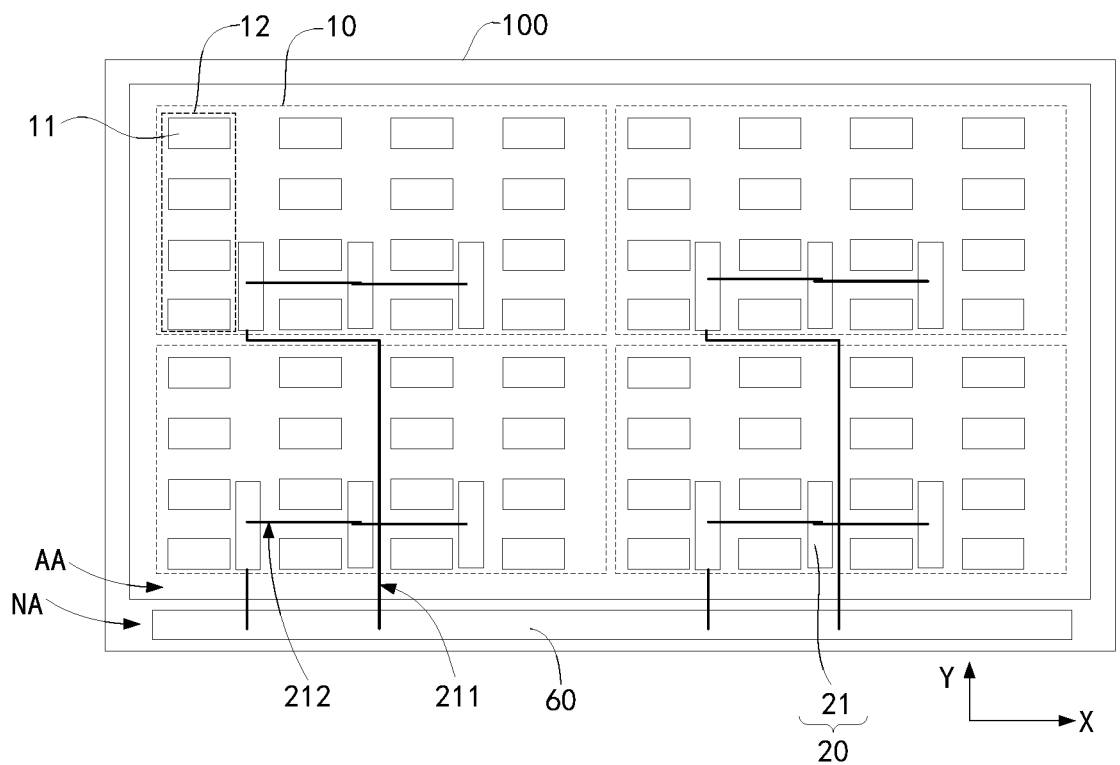
FIG. 2 is a first schematic structural top view of a distributed SOP display panel according to an embodiment of the present disclosure.

Please refer to FIGS. 1 and 2, FIG. 1 is a schematic frame diagram of a distributed SOP display system according to an embodiment of the present disclosure. FIG. 2 is a first schematic structural top view of a distributed SOP display panel according to an embodiment of the present disclosure. The distributed SOP display system 1000 comprises a distributed SOP display panel 100, at least one signal splitting module 200, and a signal source 300. An input terminal of the signal splitting module 200 is connected to the signal source 300, and an output terminal of the signal splitting module 200 is connected to the distributed SOP display panel 100. The signal source 300 is configured to provide standard display signals to the signal splitting module 200, and the signal splitting module 200 is configured to receive the standard display signals and output functional signals to the distributed SOP display panel 100.

The distributed SOP display panel 100 comprises a plurality of display modules and a plurality of functional modules. Each of the display modules 10 comprises a plurality of display units 11, and the plurality of functional modules 20 are disposed in the display modules 10. The signal splitting module 200 is connected to the functional modules 20 for splitting standard display signals into a plurality of functional signals to the functional modules 20. Part of the functional modules 20 are connected to the display units 11, and are configured to convert received functional signals into corresponding display signals and send to corresponding display modules 10.

It should be noted that the signal splitting module 200 is capable of splitting standard display signals into a plurality of functional signals. The standard display signal is a high-frequency signal (for example, 3 Gbps or more) provided by the signal source 300, such as a host. The standard display signal cannot be directly received and processed by the display modules 10 and the functional modules 20 on the distributed SOP display panel 100. Since the display modules 10 comprise the display units 11 and the functional modules 20 comprise functional units (not shown), both the display units 11 and the functional units can comprise thin film transistors, capacitors, or resistors, etc. Thin film transistors, capacitors, resistors and other components only have ability to process signals of a certain frequency. When signals with signal frequencies beyond their processing capabilities are inputted to these components, problems such as failure will occur, and thus the distributed SOP display panel 100 cannot work normally. A plurality of parallel functional signals split by the signal splitting module 200 are low-frequency signals (for example, 10 MHz~300 MHz), and the low-frequency functional signals can be received and processed by the functional modules 20 on the distributed SOP display panel 100. Correspondingly, some of the functional modules 20 convert the low-frequency functional signals into display signals that can be received and processed by the display modules 10.

In addition, alternatively, the signal splitting module 200 may be integrated on or disposed separately from the distributed SOP display panel 100. When the signal splitting module 200 is integrated on the distributed SOP display panel 100, the signal splitting module 200 may be located within or on one side of the display module 100. When the signal splitting module 200 is disposed separately from the distributed SOP display panel 100, the signal splitting module 200 may communicate with the distributed SOP display panel 100 by a connection such as signal lines. Further, a number of the signal splitting modules 200 may be one or more, and when the number of the signal splitting modules 200 is multiple, the plurality of the signal splitting modules 200 may be connected in series.

A structure of the distributed SOP display panel 100 will be described in detail below with reference to FIGS. 1 and 2.

Specifically, the distributed SOP display panel 100 comprises a plurality of display modules 10 and a plurality of functional modules 20. Each of the display modules 10 comprises a plurality of display unit groups 12 arranged at intervals in a first direction X. Each of the display unit groups 12 comprises a plurality of display units 11 arranged at intervals in a second direction Y. The display units 11 may be liquid crystal units, micro light-emitting diodes (Micro-LED), sub-millimeter light-emitting diodes (Mini-LED), organic light emitting diodes, or the like, which are not limited herein. Alternatively, the first direction X is a horizontal direction, and the second direction Y is a vertical direction.

Each of the display modules 10 is configured to receive corresponding display signals, each of the display modules 10 comprises a plurality of display units 11, and a parameter of each of the display signals is less than or equal to a processing capability peak value of a corresponding display module 10. The parameter of the display signal may be a value corresponding to a signal frequency of the display signal, or may be another characteristic parameter of the display signal. The processing capability peak value of the display module 10 may be a maximum value of the signal frequency of the display signal that can be processed by the display unit 11 of a lowest processing power among the plurality of display units 11 constituting the display module 10.

Each of the functional modules 20 comprises a plurality of functional units disposed between adjacent display units 11, each of the functional modules 20 is configured to receive corresponding functional signals, a parameter of each of the functional signals is less than or equal to a processing capability peak value of a corresponding functional module 20. Wherein the parameter of the functional signal may be a value corresponding to a signal frequency of the functional signal, or may be another characteristic parameter of the functional signal. The processing capability peak value of the functional module 20 may be a maximum value of the signal frequency of the functional signal that can be processed by the functional unit having a lowest processing capability among the plurality of functional units constituting the functional module 20.

In the present disclosure, by integrating the functional modules 20 into the display area AA, it is advantageous to realize a narrow frame or borderless design of the distributed SOP display panel 100. In addition, it is possible to realize that a plurality of display modules are driven by different signals while increasing the screen ratio, thereby achieving a high frequency of an entire distributed SOP display panel 100. At the same time, a distance between the functional module 20 and the display unit 11 can be reduced, which facilitates reducing an impedance of a signal transmission line and reducing a voltage drop.

Alternatively, the functional module 20 comprises a first functional module 21, the functional signal comprises a first functional signal, and the first functional module 21 is electrically connected to display units 11 in an adjacent display module 10 to provide a corresponding unique display signal for a corresponding display module 10 according to the first functional signal. The unique display signal is unique to each of the display modules 10. For example, the unique display signal is a source driving signal, a gate signal, or the like.

The distributed SOP display panel 100 further comprises a plurality of first signal connection lines 211, the first signal connection lines 211 are electrically connected to the first functional modules 21 corresponding to the display modules 10 for providing the first functional signals to the first functional modules 21, and the first signal connection lines 211 are disposed between adjacent display units 11. The plurality of first functional modules 21 are arranged flush in the first direction X, the plurality of first signal connection lines 211 corresponding to the first functional modules 21 extend in the second direction Y, and the first signal connection lines 211 corresponding to different first functional modules 21 are arranged between different display unit groups 12.

Specifically, the first functional module 21 is a source signal generator disposed between adjacent display unit groups 12 of a same display module for providing unique display signals to corresponding display unit groups 12. The source signal generator is configured to generate source driving signals to supply the corresponding display unit groups 12 with source driving signals, and in this case, the unique display signals are source driving signals, that is, data signals required by corresponding display unit groups 12, and the data signals are transmitted to each display unit 11 in the corresponding display unit groups 12 through data lines.

Alternatively, the source signal generator is designed in a shape of a strip, and since a width of an interval between the display unit groups 12 is limited, the source signal generator of the strip design is more easily placed between adjacent display unit groups 12. The source signal generators of each display module and the signal splitting module 200 are connected via the first signal connection lines 211 for transmitting the first functional signals to the source signal generators.

Within a same display module 10, each of the display unit groups 12 corresponds to a source signal generator, and a plurality of source signal generators are connected in cascade. The source driving signal output by each of the source signal generators is connected to each of the display units 11 within the corresponding display unit group 12 to supply the source driving signal to each of the display units 11. Alternatively, the source signal generator comprises modules such as a shift register, a latch, a decoder, and an analog-to-digital signal converter, in which the shift registers of different source signal generators are cascaded through second signal connection lines 212, thereby enabling cascaded connections between the plurality of source signal generators. The second signal connection lines 212 extend in the first direction X.

Since the plurality of source signal generators in the same display module 10 are connected in cascade through the second signal connection lines 212, only one source signal generator in each of the display modules 10 needs to be connected to the first signal connection line 211. In this way, when the display area AA of the distributed SOP display panel 100 is divided into a plurality of display modules and the source signal generator is placed in the display area AA, the number of wires in the display area AA of the distributed SOP display panel 100 can be greatly reduced by cascading the plurality of source signal generators, so as to reduce cross-lining, reduce impedance, and reduce interference with display pixels.

Further, the first signal connection lines 211 extend in the second direction Y, and the first signal connection lines 211 of different display modules are disposed at intervals between different display unit groups 12 in parallel, so that the first signal connection lines 211 are uniformly distributed to maximize the use of space between the display units 11, and it is possible to prevent signal interference problems caused when the first signal connection lines 211 of the plurality of display modules are concentrated between the same display unit group 12.

Alternatively, the distributed SOP display panel 100 further comprises a display area AA and a signal input terminal 60 at a side of the display area AA, and the display area AA is divided into a plurality of display modules 10 arranged in an array in the display area AA. The signal splitting module 200 communicates with the distributed SOP display panel 100 through the signal input terminal 60. Specifically, the first functional modules 21 are electrically connected to the signal input terminal 60 through the first signal connection lines 211. The signal splitting module 200 transmits split first functional signals to the signal input terminal 60. The signal input terminal 60 transmits the first functional signals to the first functional modules 21 through the first signal connection lines 211. The first functional modules 21 transfer the first functional signals into the unique display signals to provide to the corresponding display modules Wherein, the signal input terminal 60 may be a flexible printed circuit board (FPC) or the like.

The distributed SOP display panel 100 may further comprise a non-display area NA in which the signal input terminal 60 may be disposed. Of course, there may be no non-display area NA in the distributed SOP display panel 100. In this case, the signal input terminal 60 may be provided in the display area AA. In this embodiment, taking the signal input terminal 60 being provided in the non-display area NA as an example. The first signal connection lines 211 extend in the second direction Y to the signal input terminal 60, and a long side direction of the signal input terminal is parallel to the first direction X, that is, the signal input terminal 60 is horizontally disposed in the non-display area NA of the distributed SOP display panel 100.

It should be noted that the first signal connection lines 211 of different display modules are uniformly distributed between different display units, and the first signal connection lines 211 of some of the display modules are further extended in the first direction X to avoid the first signal connection lines 211 of other display modules. In particular, in a same column of the display modules 10 arranged at intervals along the second direction Y, the display unit groups 12 of the display modules 10 are also aligned with each other in the column direction. When source signal generators located between adjacent display unit groups 12 of a same column are introduced into the first signal connection lines 211, the first signal connection lines 211 of some of the display modules 10 are first extended in the first direction X, and then extended to the signal input terminal 60 parallel to the second direction Y, so that the first signal connection lines 211 of different display modules 10 are separated from each other by the display unit groups 12.

Figure 3:
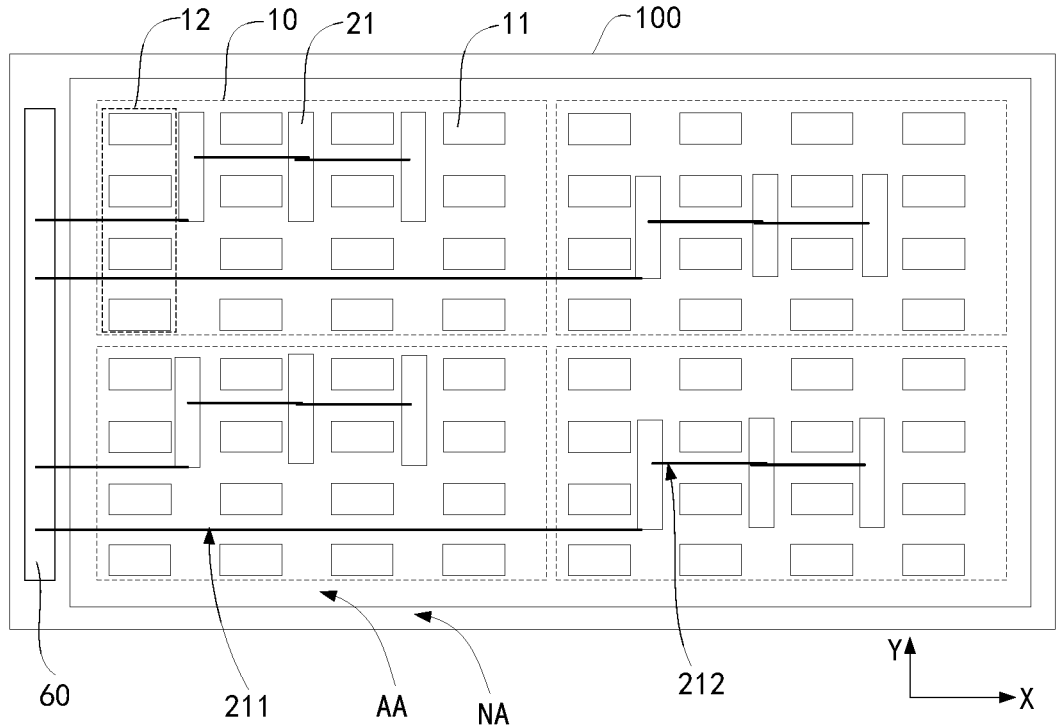
FIG. 3 is a second schematic structural top view of a distributed SOP display panel according to an embodiment of the present disclosure.

In one embodiment, referring to FIG. 3, FIG. 3 is a second schematic structural top view of a distributed SOP display panel according to an embodiment of the present disclosure. In contrast to the above-described embodiments, the plurality of first functional modules 21 are staggered along the first direction X, the first signal connection lines 211 corresponding to the plurality of first functional modules 21 extend along the first direction X, and the first signal connection lines 211 corresponding to different first functional modules 21 are disposed between different display units 11.

Specifically, source signal generators of at least two display modules arranged at intervals along the first direction X are staggered, and first signal connection lines 211 of different display modules extend in parallel to the first direction X and are arranged between different display units 11 in parallel and spaced. The staggered arrangement of the source signal generators of at least two display modules means that the source signal generators are placed in different positions in each display module 10, and longitudinal positions of the source signal generators in different display modules 10 of a same row are sequentially downward. The display modules 10 of the same row refer to a plurality of display modules 10 arranged at intervals along the first direction X.

The introduction of input signal lines of the source signal generators, i.e., the introduction of the first signal connection lines 211, is facilitated by the staggered arrangement of the source signal generators of different display modules of a same row. Specifically, the first signal connection lines 211 of different display modules of a same row extend along the first direction X to the signal input terminal and a long side direction of the signal input terminal 60 is parallel to the second direction Y, that is, the signal input terminal 60 is vertically disposed in the non-display area NA of the distributed SOP display panel 100.

Since the signal input terminals 60 are vertically disposed and the source signal generators of different display modules 10 are staggered, the first signal connection lines 211 can be directly introduced from the signal input terminals 60 to the corresponding source signal generators in a direction parallel to the first direction X, and the first signal connection lines 211 of different display modules 10 are spaced apart by the display units 11, so that the first signal connection lines 211 are uniformly distributed to maximize the use of the space between the display units 11, thereby reducing the cross-lining, reducing the impedance, reducing the interference with the display pixels, and making layout of modules in the distributed SOP display panel 100 reasonable. For other descriptions, refer to the above embodiments, and details are not described herein.

Figure 4:
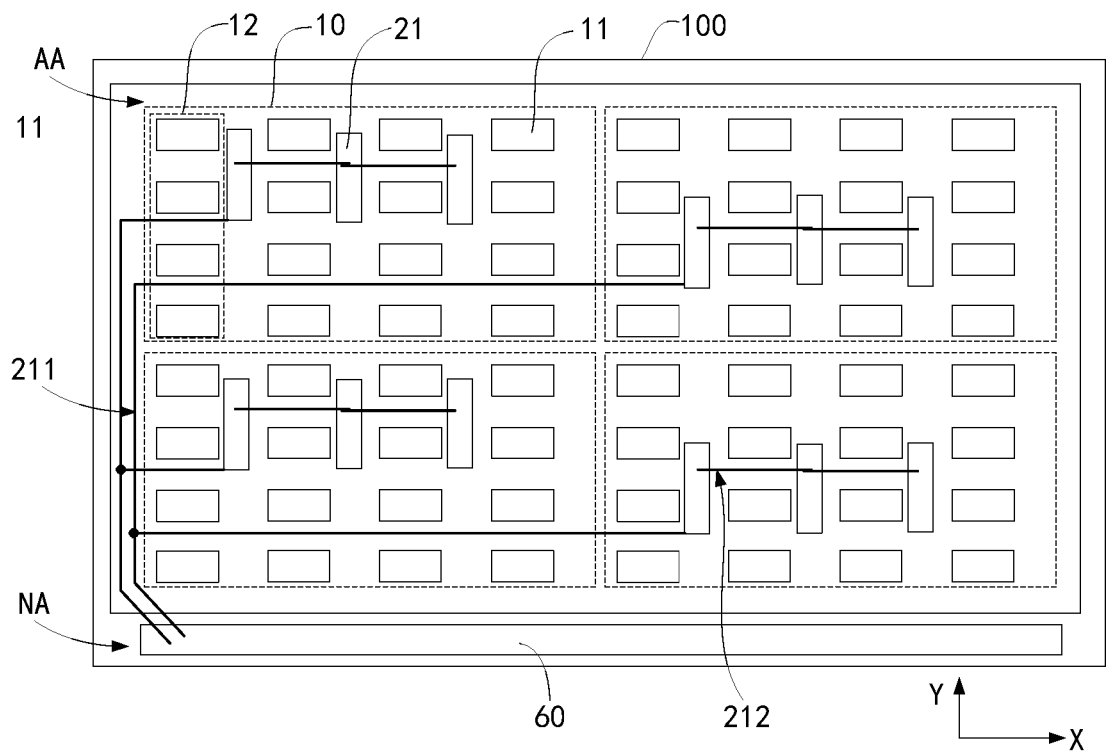
FIG. 4 is a third schematic structural top view of a distributed SOP display panel according to an embodiment of the present disclosure.

In one embodiment, referring to FIG. 4, FIG. 4 is a third schematic structural top view of a distributed SOP display panel according to an embodiment of the present disclosure. In contrast to the above-described embodiments, the first functional modules 21 corresponding to at least two display modules 10 arranged at intervals along the first direction X and/or the second direction Y are connected to a same first signal connection line 211 for providing the first functional signals to the plurality of first functional modules 21 to reduce the number of the first signal connection lines 211.

Specifically, since different signal lines have different demands for high frequencies, signal lines having lower demands for high frequencies can be shared to reduce the number of signal lines. For example, as shown in FIG. 4, taking a plurality of display modules 10 arranged at intervals along the second direction Y sharing a same first signal connection line 211 for example. The first signal connection line 211 is led out of the signal input terminal 60 and extends along the second direction Y, and the first signal connection line 211 is introduced into a source signal generator of the display module 10 when the first signal connection line 211 is extended to the corresponding display module 10, so that the plurality of display modules 10 share the same first signal connection line 211. With this wiring method, the number of the first signal connection lines 211 can be reduced, so that the number of lines in the display area AA of the distributed SOP display panel 100 can be further reduced, so that the cross-lining is reduced, the impedance is reduced, and the interference with the display pixels is reduced. For other descriptions, refer to the above embodiments, and details are not described herein.

Figure 5:
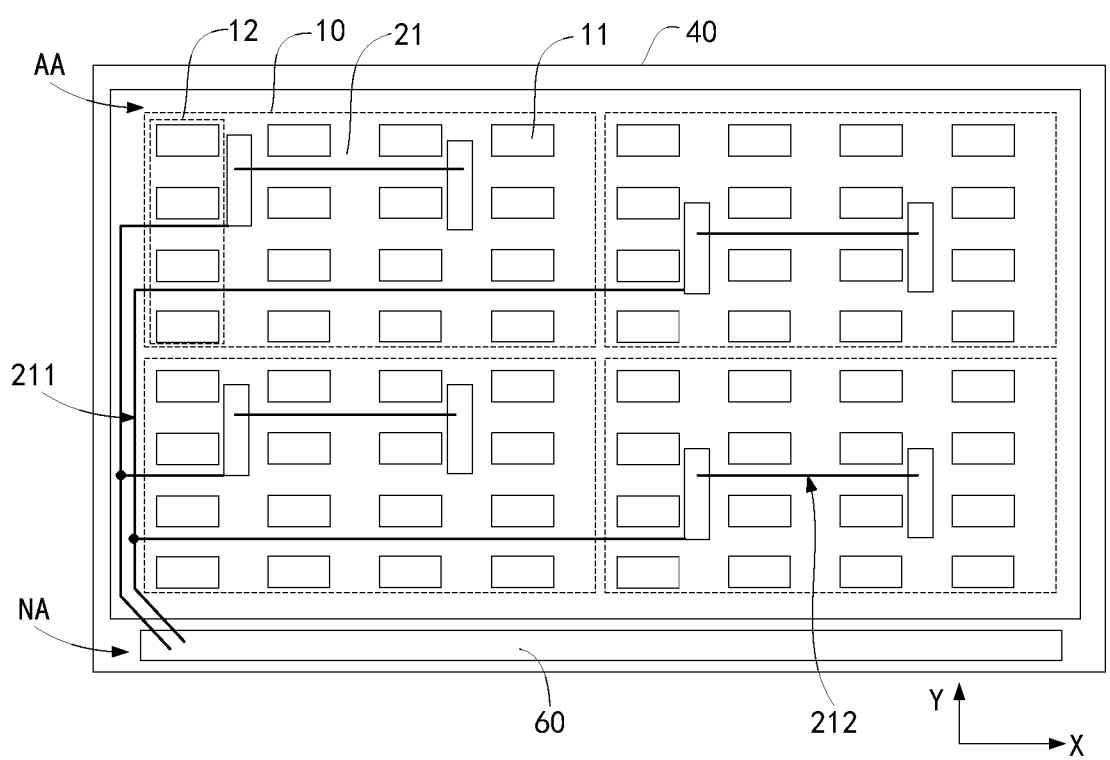
FIG. 5 is a fourth schematic structural top view of a distributed SOP display panel according to an embodiment of the present disclosure.

In one embodiment, referring to FIG. 5, FIG. 5 is a fourth schematic structural top view of a distributed SOP display panel according to an embodiment of the present disclosure. In contrast to the above embodiments, at least two column display unit groups 12 in a same display module 10 share one source signal generator. Thus, the number of source signal generators in the same display module 10 can be reduced to save pixel space. For other descriptions, refer to the above embodiments.

In one embodiment, referring to FIGS. 1 to 6, FIG. 6 is a fifth schematic structural top view of a distributed SOP display panel according to an embodiment of the present disclosure. In contrast to the above-mentioned embodiments, a first functional module 21' further comprises a gate driver on array (GOA) module 30 and a GOA signal generator 31. Each of the display modules 10 comprises a plurality of display unit groups 12 arranged at intervals in the first direction X, and each of the display unit groups 12 comprises a plurality of display units 11 arranged at intervals in the second direction Y. The GOA module 30 and the GOA signal generator 31 are disposed between adjacent display unit groups 12 for providing a corresponding display module 10 with unique display signals, and the GOA signal generator 31 is disposed between adjacent two GOA units of the GOA module 30.

Figure 6:
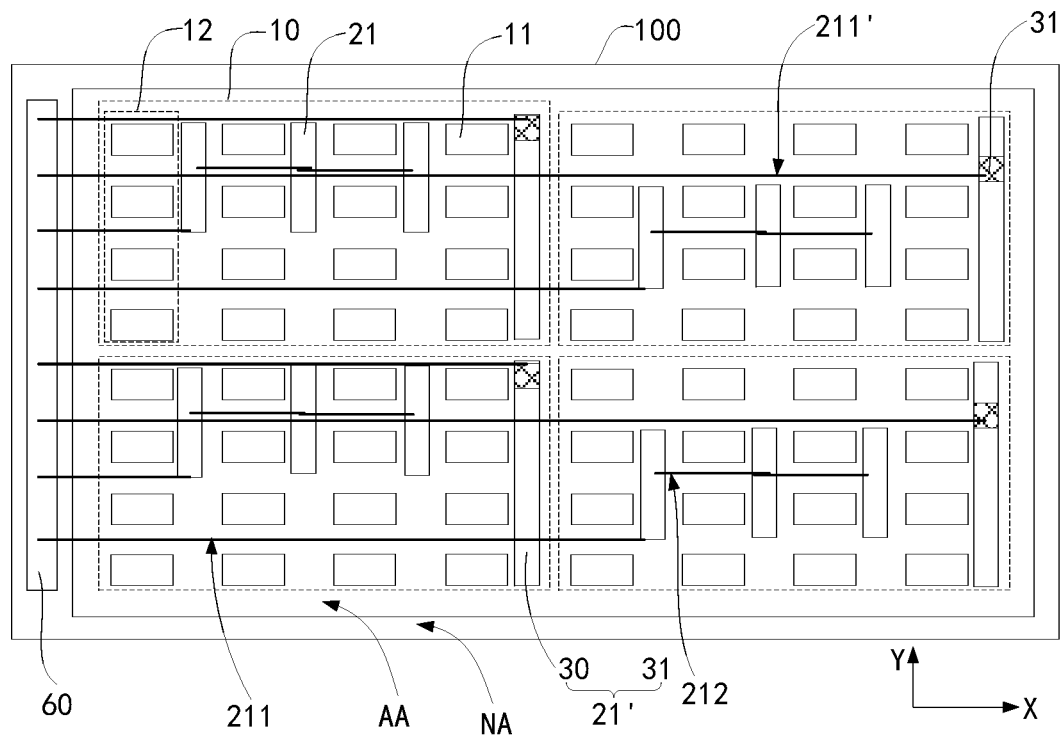
FIG. 6 is a fifth schematic structural top view of a distributed SOP display panel according to an embodiment of the present disclosure.

Specifically, the GOA module is also provided in a strip shape and disposed between adjacent display unit groups 12. In order to realize an independent control of each of the display modules 10, a GOA module 30 may be provided in each of the display modules 10, and the GOA module 30 shown in FIG. 6 is disposed on a side of the display unit groups 12 in the display module 10. The GOA module comprises a plurality of cascaded GOA units, and the GOA signal generator 31 is disposed between any two adjacent stages of the GOA units to provide the GOA units with GOA signals including a clock signal and the like. The GOA units of each GOA module 30 receives corresponding GOA signals, and outputs gate scan signals to the display units 11 of a same row in a same display module 10 for driving the display units 11 of the same row, and the gate scan signals are the unique display signals.

The GOA signal generator 31 is connected to the signal input terminal 60 via a first signal connection line 211' for converting the first functional signals output by the signal splitting module 200 into GOA signals. Wherein the first signal connection line 211' connected to the GOA signal generator 31 and the first signal connection line 211 connected to the source signal generator are different signal connection lines. The signal input terminal 60 is vertically disposed, and the first signal connection line 211' extends in the first direction X to the signal input terminal 60. At the same time, the GOA signal generators 31 of at least two display modules 10 arranged at intervals in the first direction X are staggered so that the first signal connection lines 211' of different display modules 10 extend in the first direction X and are arranged between the different display units 11 in parallel and spaced so that the first signal connection lines 211' are uniformly distributed so as to maximize the use of the space between the display units 11, thereby reducing line-crossing, reducing impedance, and reducing interference with the display pixels.

It should be noted that layout mode of the GOA modules 30 and the GOA signal generators 31 in the display area AA of the distributed SOP display panel 100 is not limited to the layout mode shown in FIG. 6. The layout mode of the GOA modules 30 and the GOA signal generators 31 may be a layout mode of the source signal generators in the above embodiments. For details, refer to the above embodiments.

Figure 7:
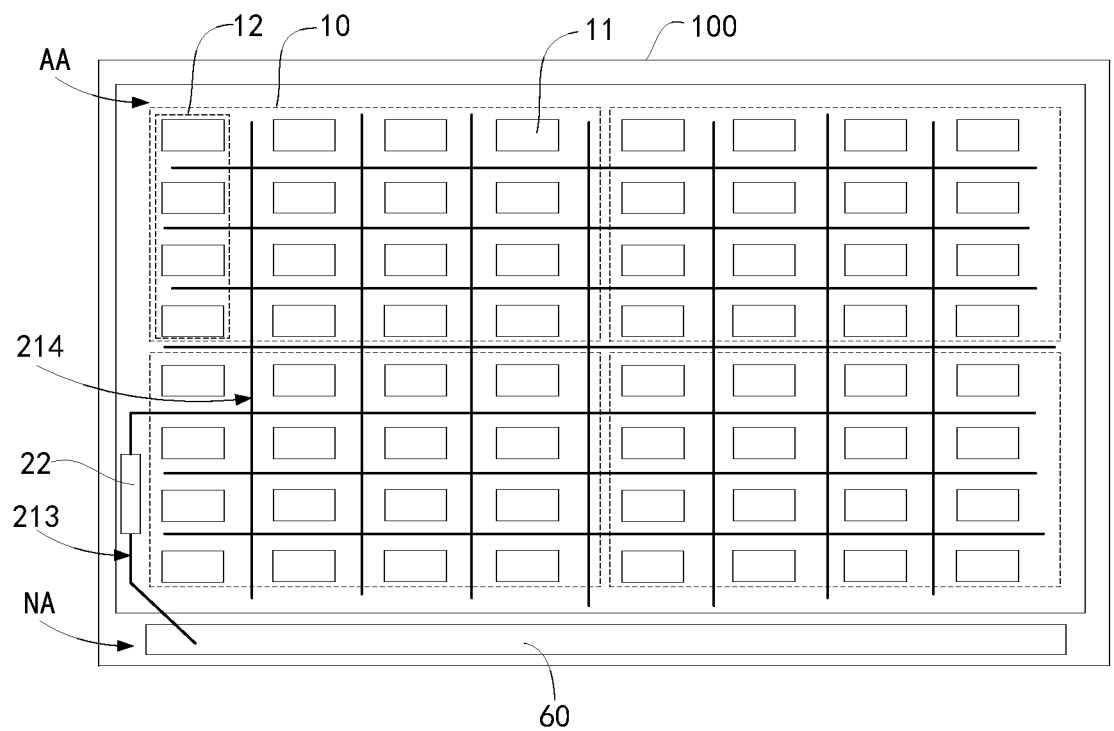
FIG. 7 is a sixth schematic structural top view of a distributed SOP display panel according to an embodiment of the present disclosure.

In one embodiment, referring to FIG. 7, FIG. 7 is a sixth schematic structural top view of a distributed SOP display panel according to an embodiment of the present disclosure. In contrast to the above-described embodiments, the functional modules 20 further comprise a second functional module 22, the functional signal further comprises a second functional signal, and the second functional module 22 is electrically connected to the plurality of display modules 10 to provide a sharing display signal for the corresponding plurality of display modules 10 according to the second functional signal.

Specifically, the distributed SOP display panel 100 further comprises a third signal connection line 213 and a plurality of fourth signal connection lines 214, the third signal connection line 213 is electrically connected to the second functional module 22 for providing the second functional signal to the second functional module 22, and the third signal connection line 213 is disposed between adjacent display units 11. The second functional module is connected to the plurality of display modules 10 through the plurality of fourth signal connection lines 214 for providing the sharing display signals to the plurality of display modules 10, and the plurality of fourth signal connection lines 214 are intersected between adjacent display units 11.

Thus, the second functional module 22 is connected to the signal input terminal 60 through the third signal connection line 213, so that the signal input terminal 60 provides the second functional signal to the second functional module 22 through the third signal connection line 213. At the same time, the second functional module 22 is connected to the plurality of display modules 10 through the plurality of fourth signal connection lines 214 so that the plurality of display modules 10 are connected to each other, and the second functional module 22 provides the sharing display signal to the plurality of display modules 10 through the fourth signal connection lines 214 so that the display modules 10 share the sharing display signal.

The sharing display signal comprises sharing signals such as VSS, VDD, VGH, and VGL, which are shared by the display units 11 on the distributed SOP display panel 100. Therefore, the sharing signals in the display modules 10 can be connected through the fourth signal connection lines 214 intersected vertically and horizontally, and then connected to the signal input terminal 60 through the third signal connection line 213 at a position close to the signal input terminal 60. With this wiring method, the connection wires with the signal input terminal 60 can be reduced, and a space of the non-display area NA occupied by the signal input terminal 60 can be reduced.

In addition, for each of the functional modules 20, such as the source signal generator, a certain driving voltage is also required to drive the source signal generator. The source signal generators of the same distributed SOP display panel generally have same specifications. The source signal generators of the same specifications need a same operating voltage, and thus power supply lines for proving driving voltages to the source signal generators may also be shared. Thus, with reference to the wiring mode in which the display modules 10 share the sharing display signal, the power supply lines of the source signal generators are also designed in a vertical and horizontal staggered mesh structure so as to reduce connection lines with a flexible printed wiring board. Of course, other signals that can be shared by the functional modules 20 may be wired in this manner. For other descriptions, refer to the above embodiments, and details are not described herein.

Figure 8:
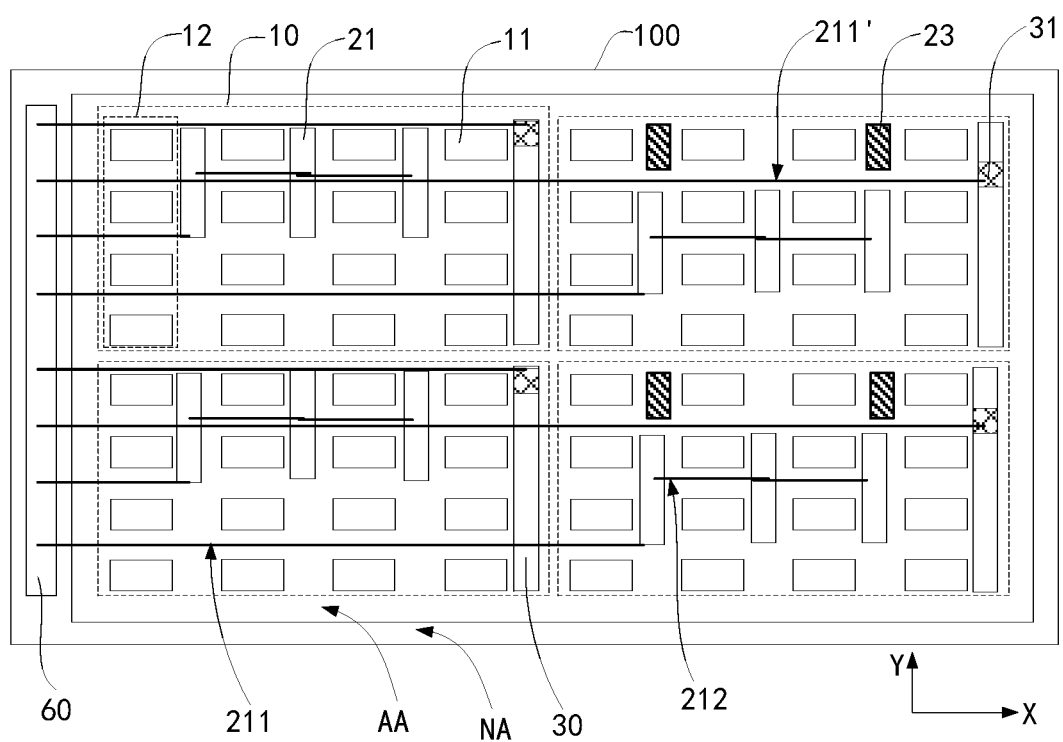
FIG. 8 is a seventh schematic structural top view of a distributed SOP display panel according to an embodiment of the present disclosure.

In one embodiment, referring to FIG. 8, FIG. 8 is a seventh schematic structural top view of a distributed SOP display panel according to an embodiment of the present disclosure. In contrast to the above-described embodiments, the functional modules 20 further comprise third functional modules 23 disposed between adjacent display units 11, and disposed in a region where the first functional modules 21 and/or the second functional modules 22 are not disposed. The third functional modules are configured to implement a non-display function of the distributed SOP display panel 100. The third functional modules 23 comprise one or more of a ROM module, a RAM module, a CPU module, an artificial intelligence module, an antenna module, an audio module, a sensor module, and a power supply module.

Specifically, as shown in FIG. 8, the first functional modules 21 (such as the source signal generator, the GOA module 30, and the GOA signal generator 31) integrated in the display area AA of the distributed SOP display panel 100 occupy only a part of gaps between the display units 11. Therefore, the third functional modules 23 can be placed in the area where the first functional modules 21 are not provided between the display units 11 at the same time so as to fully utilize the gaps between the display units 11 and improve the screen proportion of the distributed SOP display panel 100 and the integration degree of the distributed SOP display panel 100.

According to the above-described embodiment,

The present disclosure provides a distributed SOP display panel and a display system. The distributed SOP display panel comprises a plurality of display modules and a plurality of functional modules. Each display module comprises a plurality of display units. The plurality of functional modules are disposed between adjacent display units, therefore there is no needs to occupy the non-display area, thereby achieving the narrow frame. The functional modules comprise first functional modules and the second functional module, the first functional modules are electrically connected to the display units in adjacent display modules, and are configured to provide corresponding unique display signals for the corresponding display modules according to the first functional signals; the second functional module is electrically connected to a plurality of display modules, and is configured to provide sharing display signals for the corresponding plurality of display modules according to the second functional signals, so that the functional modules are reasonably disposed in the display modules, a distance between the functional module and the display unit is reduced, an impedance of a signal transmission line is reduced, and a voltage drop is reduced. At the same time, the wiring of each functional module is optimized to optimize the number of signal wires, reduce the cross-lining, reduce the impedance, and reduce the interference of the signal wires on the display pixels, thereby solving the technical problem of improper system function layout of the conventional SOP display device.

In the above-described embodiments, the descriptions of the various embodiments are each focused, and portions of some embodiments that are not detailed may be referred to the related descriptions of other embodiments.

The above described embodiments of the present disclosure are described in detail, and the principles and embodiments of the present disclosure are described by using specific examples herein. The description of the above embodiments is only used to help understand the technical solutions and core ideas of the present disclosure; those of ordinary skill in the art should understand that it is still possible to modify the technical solutions recorded in the foregoing embodiments, and these modifications or replacements do not cause the essence of the corresponding technical solutions to deviate from the scope of the technical solutions of the embodiments of the present disclosure.

What is claimed is:

1. A distributed system on panel (SOP) display panel, comprising:
a display area divided into a plurality of display modules, wherein each of the display modules comprises a plurality of display unit groups arranged at intervals in a first direction, each of the display unit groups comprises a plurality of display units arranged at intervals in a second direction, each of the display modules is configured to receive corresponding display signals, and a parameter of each of the display signals is less than or equal to a processing capability peak value of a corresponding display module; and a plurality of functional modules, wherein each of the functional modules is configured to receive corresponding functional signals and convert the corresponding functional signals into display signals that are received by the display modules, and a parameter of each of the functional signals is less than or equal to a processing capability peak value of a corresponding functional module;

wherein the functional modules comprise first functional modules, the functional signals comprise first functional signals, the first functional modules are electrically connected to display units adjacent to the first functional modules in the display modules, and are configured to provide corresponding unique display signals for corresponding display modules according to the first functional signals, wherein each of the display modules is provided with a plurality of first functional modules, each of the plurality of first functional modules provided in a same display module is arranged between adjacent display unit groups in the same display module and are electrically connected to display units of at least one of the display unit groups in the same display module, and wherein the distributed SOP display panel further comprises a plurality of first signal connection lines electrically connected to the first functional modules corresponding to the display modules for providing the first functional signals to the first functional modules, and each of the display modules corresponds to one of the first signal connection lines.

2. The distributed SOP display panel according to claim 1, wherein the functional modules further comprise a second functional module, the functional signals further comprise a second functional signal, and the second functional module is electrically connected to the plurality of display modules to provide sharing display signals for a corresponding plurality of display modules according to the second functional signal.

3. The distributed SOP display panel according to claim 2, wherein the first signal connection lines are disposed between adjacent display units.

4. The distributed SOP display panel according to claim 3, wherein the plurality of first functional modules are arranged flush in the first direction, the first signal connection lines corresponding to the plurality of first functional modules extend in the second direction, and the first signal connection lines corresponding to different first functional modules are arranged between different display unit groups.

5. The distributed SOP display panel according to claim 3, wherein the plurality of first functional modules are staggered in the first direction, the first signal connection lines corresponding to the plurality of first functional modules extend in the first direction, and the first signal connection lines corresponding to different first functional modules are disposed between different display units.

6. The distributed SOP display panel according to claim 3, wherein the first functional modules corresponding to at least two of the display modules arranged at intervals along the first direction or the second direction are connected to a same first signal connection line for providing the first functional signals to the plurality of first functional modules.

7. The distributed SOP display panel according to claim 3, wherein the first functional modules comprise source signal generators, the source signal generators between different display unit groups within a same display module are cascaded connected.

8. The distributed SOP display panel according to claim 7, wherein the source signal generators comprise shift registers, the shift registers of the source signal generators are cascaded through second signal connection lines extending in the first direction.

9. The distributed SOP display panel according to claim 7, wherein at least two column of display unit groups within a same display module share one of the source signal generators.

10. The distributed SOP display panel according to claim 3, wherein the first functional modules comprise gate driver on array (GOA) signal generators and GOA modules, the GOA signal generators are electrically connected to the first signal connection lines for providing the first functional signals to the GOA signal generators, and the GOA signal generators provide GOA signals to the GOA modules according to the first functional signals.

11. The distributed SOP display panel according to claim 3, wherein the distributed SOP display panel further comprises a third signal connection line electrically connected to the second functional module for providing the second functional signals to the second functional module and disposed between adjacent display units.

12. The distributed SOP display panel according to claim 11, wherein the distributed SOP display panel further comprises a plurality of fourth signal connection lines, wherein the second functional module is connected to the plurality of display modules through the plurality of fourth signal connection lines for providing the sharing display signals to the plurality of display modules, and the plurality of fourth signal connection lines are intersected between adjacent display units.

13. The distributed SOP display panel according to claim 11, wherein the distributed SOP display panel further comprises a display area and a signal input terminal located on a side of the display area, the first signal connection lines and the third signal connection line are electrically connected to the signal input terminal, and the signal input terminal supplies the functional signals to corresponding functional modules through the first signal connection lines and the third signal connection lines, respectively.

14. The distributed SOP display panel according to claim 2, wherein the functional modules further comprise third functional modules disposed between adjacent display units, and disposed in a region in which the first functional modules or the second functional module are not disposed.

15. The distributed SOP display panel according to claim 14, wherein the third functional modules comprise one or more of a timing control module, a read only memory (ROM) module, a random access memory (RAM) module, a central processing unit (CPU) module, an artificial intelligence module, an antenna module, an audio module, a sensor module, or a power supply module.

16. A distributed system on panel (SOP) display system, comprising a distributed SOP display panel and at least one signal splitting module, wherein the signal splitting module is connected to the distributed SOP display panel for providing functional signals to functional modules, wherein the distributed SOP display panel comprises:

a display area divided into a plurality of display modules, wherein each of the display modules comprises a plurality of display unit groups arranged at intervals in a first direction, each of the display unit groups comprises a plurality of display units arranged at intervals in a second direction, each of the display modules is configured to receive corresponding display signals, and a parameter of each of the display signals is less than or equal to a processing capability peak value of a corresponding display module; and a plurality of functional modules, wherein each of the functional modules is configured to receive corresponding functional signals and convert the corresponding functional signals into display signals that are received by the display modules, and a parameter of each of the functional signals is less than or equal to a processing capability peak value of a corresponding functional module;

wherein the functional modules comprise first functional modules, the functional signals comprise first functional signals, the first functional modules are electrically connected to display units adjacent to the first functional modules in the display modules, and are configured to provide corresponding unique display signals for corresponding display modules according to the first functional signals, wherein each of the display modules is provided with a plurality of first functional modules, each of the plurality of first functional modules provided in a same display module is arranged between adjacent display unit groups in the same display module and are electrically connected to display units of at least one of the display unit groups in the same display module, and wherein the distributed SOP display panel further comprises a plurality of first signal connection lines electrically connected to the first functional modules corresponding to the display modules for providing the first functional signals to the first functional modules, and each of the display modules corresponds to one of the first signal connection lines.

17. The distributed SOP display system according to claim 16, wherein the functional modules further comprise a second functional module, the functional signals further comprise a second functional signal, and the second functional module is electrically connected to the plurality of display modules to provide sharing display signals for a corresponding plurality of display modules according to the second functional signal.

18. The distributed SOP display system according to claim 17, wherein the first signal connection lines are disposed between adjacent display units.

19. The distributed SOP display system according to claim 18, wherein the plurality of first functional modules are arranged flush in the first direction, the first signal connection lines corresponding to the plurality of first functional modules extend in the second direction, and the first signal connection lines corresponding to different first functional modules are arranged between different display unit groups.

20. The distributed SOP display system according to claim 18, wherein the plurality of first functional modules are staggered in the first direction, the first signal connection lines corresponding to the plurality of first functional modules extend in the first direction, and the first signal connection lines corresponding to different first functional modules are disposed between different display units.

* * * * *